(12) United States Patent
Kim

(10) Patent No.: US 7,575,510 B2
(45) Date of Patent: Aug. 18, 2009

(54) VEHICLE AIR-VENT

(75) Inventor: Myoung-Sug Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/195,816

(22) Filed: Aug. 3, 2005

(65) Prior Publication Data

US 2006/0057952 A1 Mar. 16, 2006

(30) Foreign Application Priority Data

Sep. 15, 2004 (KR) ...................... 10-2004-0073951

(51) Int. Cl.
*B60H 1/34* (2006.01)
*G05G 5/06* (2006.01)
(52) U.S. Cl. ........................ 454/155; 16/121
(58) Field of Classification Search ................ 454/155, 454/322, 325–327
See application file for complete search history.

(56) References Cited

U.S. PATENT DOCUMENTS

| | | | | |
|---|---|---|---|---|
| 5,230,654 A | * | 7/1993 | Bloomer | ...................... 454/155 |
| 5,584,098 A | * | 12/1996 | Koyama et al. | ................ 16/441 |
| 5,752,877 A | * | 5/1998 | Sun | .............................. 454/155 |
| 2003/0050001 A1 | * | 3/2003 | Kamio | ........................ 454/155 |
| 2003/0079564 A1 | * | 5/2003 | Thiengtham | .................. 74/525 |
| 2005/0048905 A1 | | 3/2005 | Yang | |

FOREIGN PATENT DOCUMENTS

| | | |
|---|---|---|
| JP | 2000-264051 | 9/2000 |
| JP | 2003-341356 | 12/2003 |

OTHER PUBLICATIONS

Dictionary definition of elastic) from: http://209.161.33.50/dictionary/elastic.*
English Language Abstract of JP 2000-264051.
English Language Abstract of JP 2003-341356.
U.S. Appl. No. 11/198,226 to Park, filed Aug. 8, 2005.

* cited by examiner

*Primary Examiner*—Steve McAllister
*Assistant Examiner*—Helena Kosanovic
(74) *Attorney, Agent, or Firm*—Greenblum & Bernstein P.L.C.

(57) ABSTRACT

An air-vent of a vehicle includes a front duct configured to change a discharging direction of an air stream horizontally and vertically, a rear duct connected to a rear side of the front duct and a damper hinged to an inside of the rear duct and selectively blocking the air stream, a rotatable knob coupled to a side of the front duct, formed with a hole at a side thereof, and driving the damper, and an angle-restricting device installed at a portion of the front duct, corresponding to the hole of the knob, the angle-restricting device elastically movable, and restricting a rotation angle of the knob.

3 Claims, 3 Drawing Sheets

VEHICLE AIR-VENT

RELATED APPLICATIONS

The present disclosure relate to subject meter container in Korean Application NO. 10-2004-0073951, filed on Sep. 15, 2004, which is herein expressly incorporated by reference in their entirety.

BACKGROUND OF THE INVENTION

1. Field of the Invention

The present invention relates to a vehicle air-vent, and more particularly to a vehicle air-vent for uniformly transmitting operation force, exhibiting superior performance by easily detecting the rotation range of a knob in order to open and close a damper by detecting the rotation range of the knob using a stopper and by elastically moving the stopper.

2. Description of the Related Art

Generally, an air-vent of a vehicle is an air discharging device of an air conditioning system for maintaining the indoor air at a predetermined temperature, and includes a wing installed at the front side thereof and adjusting the discharge direction of the air, and a damper installed on the inside thereof, being opened and closed to control the air discharge.

As shown in FIGS. 1 and 2, the conventional air-vent 10 includes a front duct 23 having a wing 25 rotated horizontally and vertically, a rear duct 24 having a damper 12 installed on the inside of the rear duct 24, and devices, installed at the lower side of the front duct 23, for opening and closing the damper 12.

A rotatable knob 11 as a manipulation device is installed at the lower front side of the front duct 23 by screws and washers 22, and the damper 12, as a device for blocking and allowing the air stream, is installed on the inside of the rear duct 24 and is rotated about the side shafts of the damper 12.

Moreover, a first link 16 is integrally coupled with a shaft 26 of the damper 12 and is operated together with the shaft 26. The knob 11 is formed with a hole 27 at the rear side thereof. A second link 18 has one side connected to the hole 27 by a pin 17a and the other side connected to the first link 16 by a pin 17b.

The second link 18 is bent at ane intermediate portion thereof, so as to compensate for the height difference between the knob 11 and the damper 12 when assembling the air-vent.

As such, the rotation of the knob 11 is transmitted to the damper 12 by motion of the first and second links 17 and 18 so as to open and close the damper 12.

Meanwhile, the knob 11 has a recess 19 formed at the rear side of the knob 11 by cutting off circumference of the knob 11. In the track of the recess 19, a stopper 20 formed at the wall of the front duct 23 is placed to limit the rotation angle of the knob 11 to 70 degrees.

In particular, the sides of the recess 19 and the stopper 20 are respectively formed with locking blocks 21a and 21b, so that, if the knob 11 is rotated to any limit in the rotation angle, the locking blocks 21a and 12b are interlocked with each other so as to maintain the position of the knob 11. Thus, the opened- or closed-state of the damper 12 can be maintained.

However, though the conventional air-vent is installed such that the stopper installed at the sidewall of the front duct moves in the arch-shaped recess of the knob, the rotation angle of the knob cannot be easily adjusted or detected when the stopper is worn down.

SUMMARY OF THE INVENTION

Therefore, the present invention has been made in view of the above and/or other problems, and it is an object of the present invention to provide an air-vent including a stopper elastically moved by a spring, so that a user feels the rotation of a knob rotated horizontally and vertically in order to open a damper, capable of adjusting the rotational force of the knob by adjusting the elasticity of a spring so as to reduce maintenance costs, and transmitting operation force uniformly so as to exhibit superior performance.

In accordance with the present invention, the above and other aspects can be accomplished by the provision of an air-vent of a vehicle including a front duct configured to change a discharging direction of an air stream horizontally and vertically, a rear duct connected to a rear side of the front duct and a damper hinged to an inside of the rear duct and selectively blocking the air stream, a rotatable knob coupled to a side of the front duct, formed with a hole at a side thereof, and driving the damper, and an angle-restricting device installed at a portion of the front duct, corresponding to the hole of the knob, the angle-restricting device elastically moved, and restricting a rotation angle of the knob.

Preferably, according to one preferred embodiment of the present invention, the angle-restricting device includes a cylindrical housing integrally fixed to the front duct and having an open end, a coil spring vertically inserted into the housing, a stopper installed in the open end of the housing, elastically movable, and contacting an inner circumference of the hole, and a pair of stopper recesses formed at the inner circumference of the hole, rotating the knob, and receiving the stopper to detect whether the damper is opened or closed.

Moreover, according to another embodiment of the present invention, the angle-restricting device includes a torsion spring having a central portion and an end fixed to a side of the front duct and receiving torque in a rotation direction with respect to a shaft axis thereof, a stopper installed to the other end of the torsion spring, elastically movable by the torsion spring, and contacting an inner circumference of the hole, and a pair of stopper recesses formed at the inner circumference of the hole, rotating the knob, and receiving the stopper to detect whether the damper is opened or closed.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, the preferred embodiment of the air-vent of a vehicle according to the present invention will be described in detail with reference to the accompanying drawings.

Figure 1:
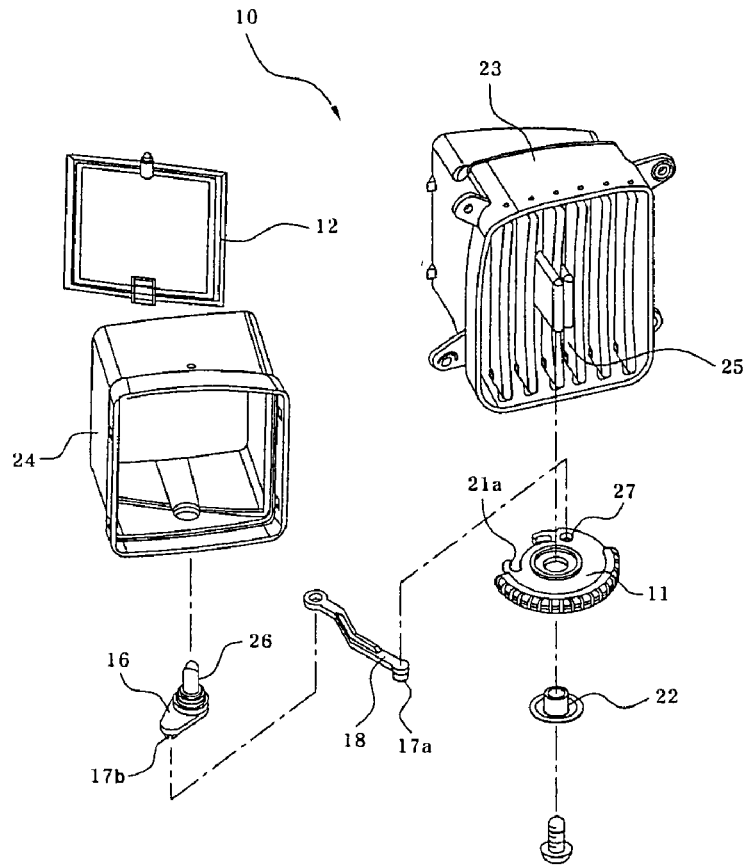
FIG. 1 is an exploded perspective view illustrating a conventional air-vent of a vehicle.
Figure 2:
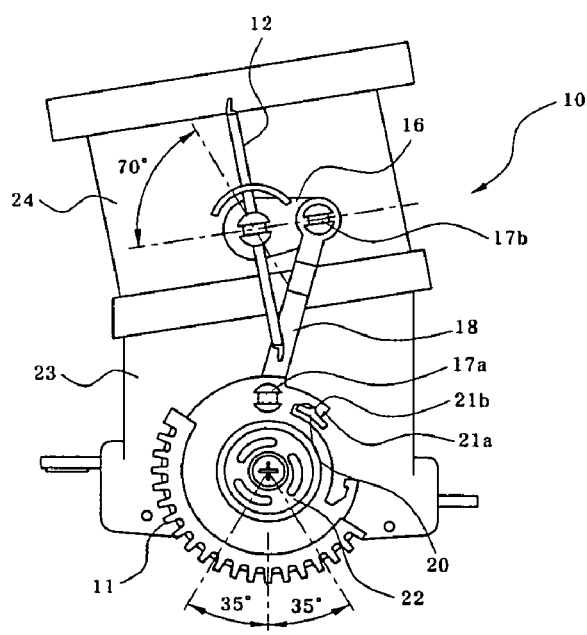
FIG. 2 is a view illustrating the conventional air-vent installed in a vehicle.
Figure 3:
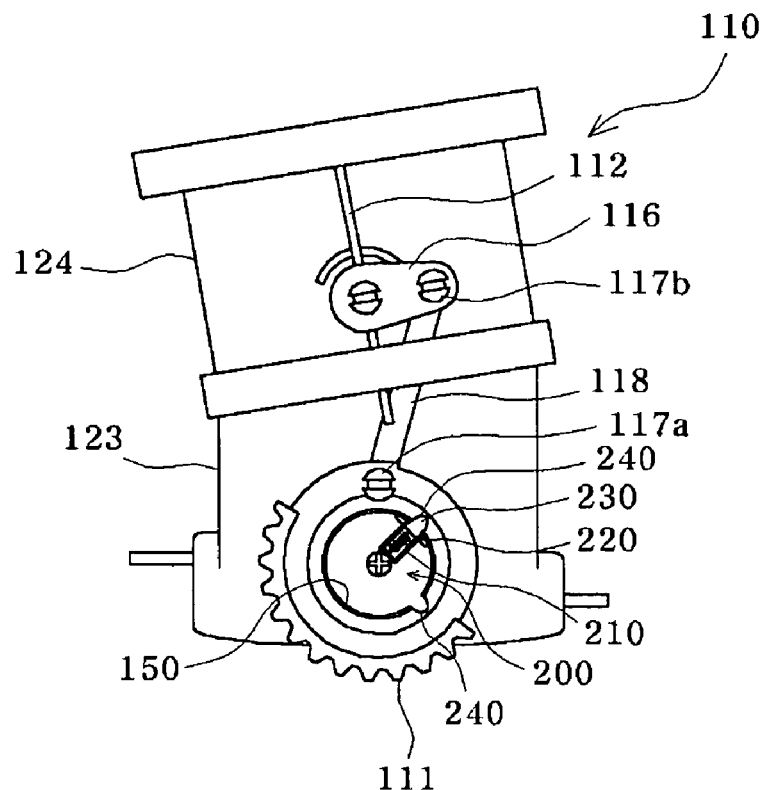
FIGS. 3 and 4 are views illustrating operation of an air-vent of a vehicle according to the preferred embodiment of the present invention.
Figure 4:
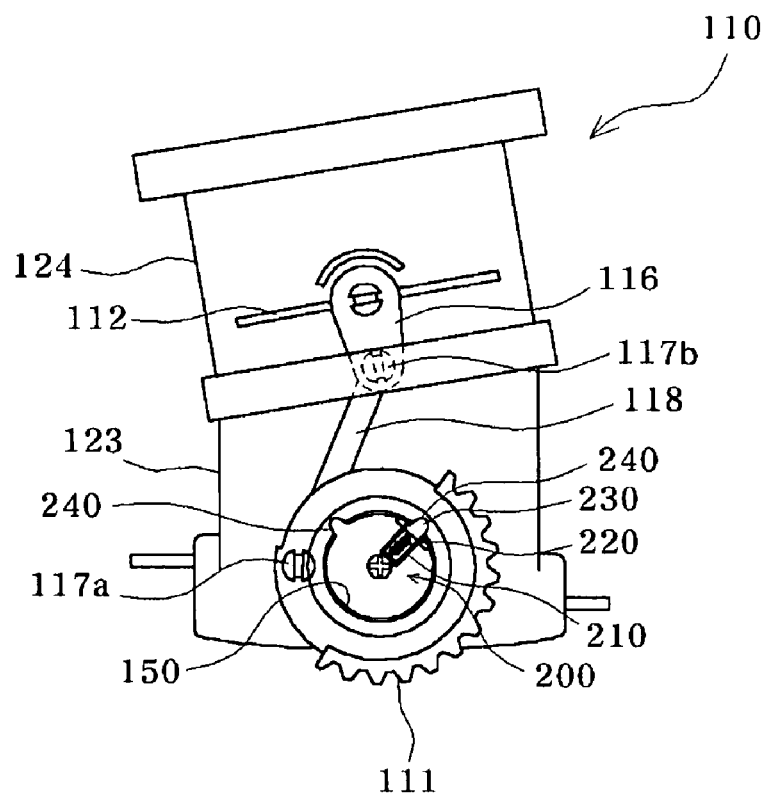
Figure 5:
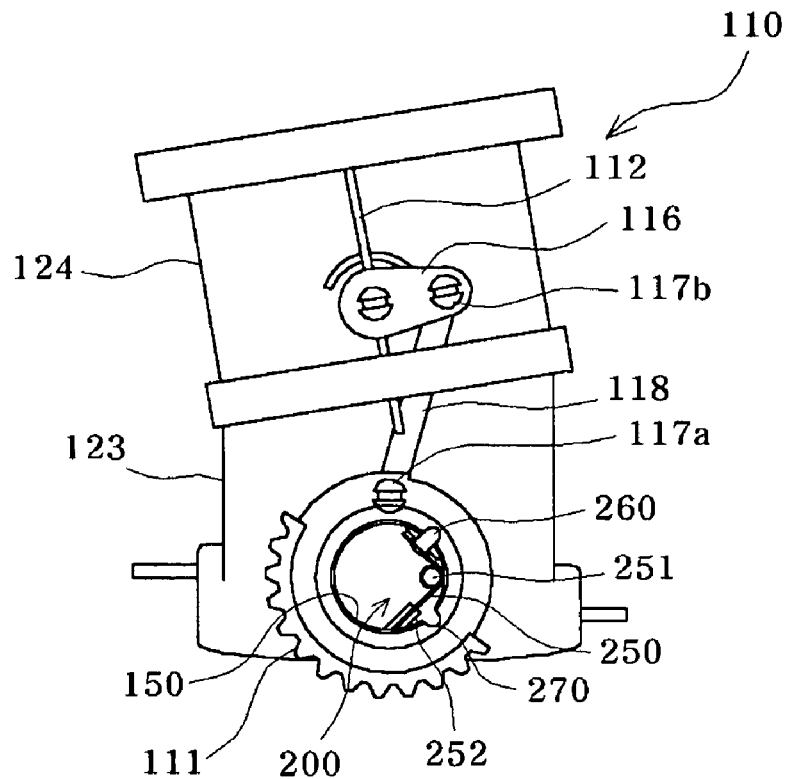
FIGS. 5 and 6 are views illustrating operation of an air-vent of a vehicle according to another preferred embodiment of the present invention.
Figure 6:
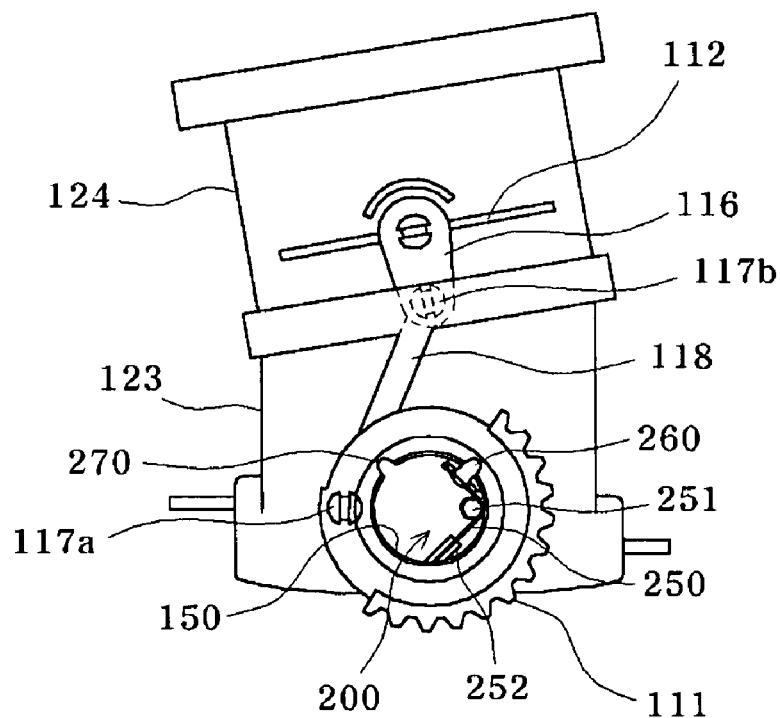

FIGS. 3 and 4 are views illustrating operation of an air-vent of a vehicle according to the preferred embodiment of the present invention, and FIGS. 5 and 6 are views illustrating operation of an air-vent of a vehicle according to another preferred embodiment of the present invention.

As shown in FIGS. 3 and 4, the air-vent 110 of a vehicle according to the preferred embodiment of the present invention includes a front duct 123 having a wing installed at the front side of the front duct 123, a rear duct 124 installed to the rear side of the front duct 123 and having a damper 112 installed at the inside of the rear duct 124, and a knob 111 for rotating the damper 112 and for opening and closing the rear duct 124.

The wing is not depicted in the drawings, but is well known.

The rotatable knob 111 is disposed at the front side of the front duct 123 by screws and washers (not shown), and the damper 112 for blocking and allowing the air stream, is disposed on the inside of the rear duct 14 and rotated about side shafts of the damper 112.

A first link 116 is integrally coupled with one of the side shafts of the damper 112 and operated together with the shaft. The rear side of the knob 111 is connected to one end of a second link 118 by a pin 117a, and the other end of the second link 118 is connected to the first link 116 by a pin 117b.

Meanwhile, the knob 111 is a circular plate and is formed with a hole 150 at the central portion thereof.

An angle-restricting device 200 for detecting the rotation of the knob 111 is installed at the side of the front duct 123 corresponding to the hole 150. The angle-restricting device 200 can be replaced with a new one with lower costs when the angle-restricting device 200 is worn down.

The angle-restricting device 200 is a cylindrical housing 210 integrally fixed to the front duct 123 and having an open end, a coil spring 220 inserted into the housing 210 in the shaft-direction, a stopper 230 inserted into the open end of the housing 210, elastically moved by the coil spring 220, and contacting the inner circumference of the hole 150, and a pair of stopper recesses 240 formed at the inner circumference of the hole 150, receiving the stopper 230, and rotating the knob 111 so that whether the damper 112 is opened or closed is detected.

The housing 210 is installed at the side of the front duct 123 corresponding to the hole 150 of the knob 111.

The housing 210 may be integrally formed with the front duct 123 by molding, or may be formed individually and installed to the front duct 123.

Moreover, the housing 210 is cylindrical and has an open end directed to the rear duct 124.

The housing 210 is gradually and upwardly slanted from the front side to the rear side of the front duct 123.

The coil spring 220 is vertically inserted into the inside of housing 210.

The stopper 230 is inserted into the open end of the housing 210 and is elastically moved by the coil spring 220.

The end of the stopper 230 contacts the inner circumference of the hole 150 and moves along an arch-shaped track formed by the inner circumference of the hole when the knob 111 rotates to a predetermined angle.

The end of the stopper 230 is rounded so as to reduce the area contacting the inner circumference of the hole and decrease friction there between.

The hole 150 is formed with a pair of stopper recesses 240 at the inner circumference thereof so as to restrict the travel distance of the stopper 230.

The stopper recesses 240 are formed at positions on the inner circumference of the hole 150 when the damper 112 in the rear duct 124 is opened or closed by the rotation of the knob 111.

The stopper recesses 240 have a predetermined depth sufficient to allow the stopper 230 to be separated by external force.

The operation of the air-vent constructed as described above, according to the preferred embodiment of the present invention, will be described in detail.

A user rotates the knob 111 to any limit, the stopper 230 of the angle-restricting device 200 moves along the inner circumference of the hole 150 of the knob 111 and is placed in one of the stopper recesses 240 so as to open or close the damper 112.

The stopper recesses 240 are formed at the positions on the inner circumference of the hole 150 to limit the rotation angle of the knob 111 to 70 degrees.

If the user rotates the knob 111 to one side end, the stopper 230 is placed in one of the stopper recesses 240 and restricts the knob 111, so that the damper 112 can be maintained in an open or closed position.

The stopper 230 is elastically moved by the coil spring 220 and is withdrawn from the stopper recess 240 when the knob 111 is rotated by external force.

As shown in FIGS. 5 and 6, since an air-vent of a vehicle according to another preferred embodiment of the present invention includes a front duct 123 having a wing installed at the front side of the front duct 123, a rear duct 124 installed to the rear side of the front duct 123 and having a damper 112 installed at the inside of the rear duct 124, and a knob 111 for rotating the damper 112 and for opening and closing the rear duct 124, and the components are identical to the components of the preferred embodiment in FIGS. 3 and 4, identical components are indicated by identical reference numerals.

The rotation angle of the knob 111 is restricted by the angle-restricting device 200.

The angle-restricting device 200 includes a torsion spring 250 having a central portion and an end fixed to the side of the front duct 123 and receiving torque in the rotation direction with respect to the axis thereof, a stopper 260 provided to be elastically moved at the other end of the torsion spring 250 and contacting the inner circumference of the hole 150, and a pair of stopper recesses 270 formed at the inner circumference of the hole 150, rotating the knob 111, and receiving the stopper 260 so that whether the damper 112 is opened or closed is detected.

The torsion spring 250 receives torque by a force applied to the sides of the torsion spring 250.

The torsion spring 250 is fixed to the side of the front duct 123 corresponding to the hole 150 of the knob 111 by a pin 251.

A fixed protrusion 252 provided at the side of the front duct 123 is inserted into the end of the torsion spring 250 so as to fix the end of the torsion spring 250 thereto.

The other end of the torsion spring 250 is spaced apart from the end of the torsion spring 250 by a predetermined angle.

The stopper 260 is inserted into the other end of the torsion spring 250, and the end of the stopper 260 rotates while contacting the inner circumference of the hole 150, thus, the arch-shaped track formed when the end of the stopper 260 has rotated.

The inner circumference of the hole 150 is formed with a pair of stopper recesses 270 for restricting the traveling range of the stopper 260 and the rotation angle of the knob 111.

The stopper recesses 270 are formed at positions on the inner circumference of the hole 150 which the damper 112 in the rear duct 124 is fully opened or completely closed by the rotation of the knob 111 in the inner circumference of the hole 150.

The stopper 260 is placed in or separated from the stopper recesses 270 by the elasticity of the torsion spring 250.

As described above, the air-vent according to the present invention is constructed such that the stopper elastically which is moved by the spring moves along the inner circumference of the hole of the knob and is restricted to be placed in the stopper recesses on the inner circumference of the hole. The precision of the opening and closing operation of the damper due to the rotation of the knob is achieved, and the operative force is uniformly transmitted by adjusting the elasticity of the spring, so that the air-vent of the present invention exhibits superior performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air-vent of a vehicle comprising:
a front duct configured to change a discharging direction of an air stream horizontally and vertically;
a rear duct connected to a rear side of the front duct and a damper hinged to an inside of the rear duct and selectively blocking the air stream;
a rotatable knob coupled to a side of the front duct, formed with a hole at a side thereof, and configured to drive the damper; and
an angle-restricting device including a cylindrical housing integrally connected to a portion of the front duct and extending generally radially within the hole of the knob, the angle-restricting device elastically radially movable to restrict a rotation angle of the knob,
wherein the angle-restricting device includes a stopper installed in an open end of the cylindrical housing, the stopper configured to elastically move around an inner circumference of the hole as the knob is rotated, a pair of spaced stopper recesses formed at the inner circumference of the hole to receive the stopper as the stopper moves around the inner circumference of the hole to detect whether the damper is opened or closed, and the stopper is configured to move outwardly in a radial direction of the cylindrical housing when the stopper is received by the spaced stopper recesses, and
the hole is provided with a substantial cylindrical space between the inner circumference thereof and the portion of the front duct where the cylindrical housing is integrally connected, when the angle restricting device is assembled
wherein the cylindrical housing connects with said inner circumference of the angle restricting device only by the stopper.

2. The air-vent of a vehicle as set forth in claim 1, wherein the angle-restricting device comprises:
a coil spring vertically inserted into the cylindrical housing.

3. An air-vent of a vehicle comprising:
a front duct configured to change a discharging direction of an air stream horizontally and vertically;
a rear duct connected to a rear side of the front duct and a damper hinged to an inside of the rear duct and selectively blocking the air stream;
a rotatable knob coupled to a side of the front duct, formed with a hole at a side thereof, and configured to drive the damper; and
an angle-restricting device installed at a portion of the front duct and extending generally within the hole of the knob, the angle-restricting device elastically generally radially movable to restrict a rotation angle of the knob,
wherein the angle-restricting device includes a stopper provided in the hole, the stopper configured to elastically move around and contact an inner circumference of the hole as the knob is rotated, a torsion spring having a central portion and one end thereof fixed to a side of the front duct and another end provided with the stopper, and a pair of spaced stopper recesses formed at the inner circumference of the hole to receive the stopper as the stopper moves around the inner circumference of the hole to detect whether the damper is opened or closed, and the stopper is configured to move outwardly in a radial direction of the hole when the stopper is received by the spaced stopper recesses.

* * * * *